United States Patent [19]
Davis et al.

[11] Patent Number: 5,890,125
[45] Date of Patent: Mar. 30, 1999

[54] METHOD AND APPARATUS FOR ENCODING AND DECODING MULTIPLE AUDIO CHANNELS AT LOW BIT RATES USING ADAPTIVE SELECTION OF ENCODING METHOD

[75] Inventors: Mark Franklin Davis, Pacifica; Matthew Conrad Fellers, San Francisco, both of Calif.

[73] Assignee: Dolby Laboratories Licensing Corporation, San Francisco, Calif.

[21] Appl. No.: 895,496

[22] Filed: Jul. 16, 1997

[51] Int. Cl.$^6$ ........................................ G01L 5/00
[52] U.S. Cl. ................... 704/501; 704/500; 381/1
[58] Field of Search ............... 711/159; 704/231, 704/500, 216, 501; 381/1, 2

[56] References Cited

U.S. PATENT DOCUMENTS

| | | | |
|---|---|---|---|
| 5,274,740 | 12/1993 | Davis et al. | 704/220 |
| 5,323,396 | 6/1994 | Lokhoff | 370/94.1 |
| 5,400,433 | 3/1995 | Davis et al. | 704/220 |
| 5,539,829 | 7/1996 | Lokhoff et al. | 381/2 |
| 5,581,653 | 12/1996 | Todd | 704/228 |
| 5,583,962 | 12/1996 | Davis et al. | 704/229 |
| 5,606,618 | 2/1997 | Lokhoff et al. | 381/2 |
| 5,632,005 | 5/1997 | Davis et al. | 704/504 |
| 5,699,484 | 12/1997 | Davis | 345/2.28 |

OTHER PUBLICATIONS

Brandenburg et al. ISO–MPEG Audio: A Generic Standard for Coding of High Quality Digital Audio pp. 780–792, Jul. 15, 1994.

*Primary Examiner*—David R. Hudspeth
*Assistant Examiner*—Harold Zintel
*Attorney, Agent, or Firm*—Gallagher & Lathrop; David N. Lathrop

[57] ABSTRACT

A split-band coding system combines multiple channels of input signals into various forms of composite signals and generates spatial-characteristic signals representing soundfield spatial characteristics in a plurality of frequency subbands. The spatial-characteristics signals may be generated in either or both of two forms. In a first form, the signal represents measures of signal levels for subband signals from the input channels. In a second form, the signal represents one or more apparent directions for the soundfield. The type of the spatial-characteristics signal may be adapted dynamically in response to a variety of criteria including input signal characteristics. Temporal smoothing and spectral smoothing of the spatial-characteristics signals may be applied in an encoder. Temporal smoothing and spectral smoothing may be applied to gain factors derived from the spatial-characteristics signals in a decoder.

69 Claims, 6 Drawing Sheets

METHOD AND APPARATUS FOR ENCODING AND DECODING MULTIPLE AUDIO CHANNELS AT LOW BIT RATES USING ADAPTIVE SELECTION OF ENCODING METHOD

TECHNICAL FIELD

The present invention relates generally to the high-quality encoding and decoding of multiple channels of audio information to reduce the information requirements of signals that convey the audio information. The present invention is useful in conveying in real time multiple channels of audio information over relatively low-bandwidth transmission paths such as the telephone lines typically used to connect a personal computer with public networks.

BACKGROUND ART

There is considerable interest among those in the fields of audio signal processing to minimize the amount of information required to represent an audio signal without perceptible loss in signal quality. By reducing the amount of information required, signal representations impose lower information capacity requirements upon communication paths and storage media.

There is particular interest in developing ways to convey in real time multiple channels of high-quality digital audio signals over relatively low-bandwidth communication paths such as conventional residential telephone lines. This type of communication path is commonly used to connect personal computers to public networks and, at present, is capable of no more than about 50 k-bits per sec. By conveying audio signal in real time, the audio information represented by the signals can be presented or played back without interruption as the signals are received.

Information capacity requirements can be reduced by applying either or both of two data compression techniques. One type, sometimes referred to as "lossy" compression, reduces information capacity requirements in a manner which does not assure, and generally prevents, perfect recovery of the original signal. Another type, sometimes referred to as "lossless" compression, reduces information capacity requirements in a manner that permits perfect recovery of the original signal.

Quantization is one well known lossy compression technique. Quantization can reduce information capacity requirements by reducing the number of bits used to represent each sample of a digital signal, thereby reducing the accuracy of the digital signal representation. In audio coding applications, the reduced accuracy or quantizing error is manifested as quantizing noise. If the errors are of sufficient magnitude, the quantizing noise will degrade the subjective quality of the coded signal.

Various audio coding techniques attempt to apply lossy compression techniques to an input signal without suffering any perceptible degradation by removing components of information which are imperceptible or irrelevant to perceived coding quality. A complementary decoding technique can recover a replica of the input signal which is perceptually indistinguishable from the input signal provided the removed component is truly irrelevant. For example, split-band encoding splits an input signal into several narrow-band signals and adaptively quantizes each narrow-band signal according to psychoacoustic principles.

Psychoacoustic principles are based on the frequency-analysis properties of the human auditory system that resemble highly asymmetrical tuned filters having variable center frequencies and bandwidths that vary as a function of the center frequency. The ability of the human auditory system to detect distinct tones generally increases as the difference in frequency between the tones increases; however, the resolving ability of the human auditory system remains substantially constant for frequency differences less than the bandwidth of the filtering behavior mentioned above. This bandwidth varies throughout the audio spectrum and is referred to as a "critical bandwidth." A dominant signal is more likely to mask the audibility of other signals anywhere within a critical bandwidth than it is likely to mask other signals at frequencies outside that critical bandwidth. A dominant signal may mask other signals which occur not only at the same time as the masking signal, but also which occur before and after the masking signal. The duration of pre- and postmasking effects depend upon the magnitude of the masking signal, but premasking effects are usually of much shorter duration than postmasking effects. The premasking interval can extend beyond 100 msec. but is generally regarded to be limited to less than 5 msec. The postmasking interval can extend beyond 500 msec. but is generally regarded to be limited to about 50 msec. A masked component of a signal is irrelevant and can be removed without changing the perceptual experience of a human listener.

Split-band audio encoding often comprises using a forward or "analysis" filter bank to divide an audio signal bandwidth into several subband signals each having a bandwidth commensurate with the critical bandwidths of the human auditory system. Each subband signal is quantized using just enough bits to ensure that the quantizing noise in each subband is masked by the spectral component in that subband and possibly adjacent subbands. Split-band audio decoding comprises reconstructing a replica of the original signal using an inverse or "synthesis" filter bank. If the bandwidths of the filters in the filter banks and the quantizing accuracy of the subband signals are chosen properly, the reconstructed replica can be perceptually indistinguishable from the original signal.

Two such coding techniques are subband coding and transform coding. Subband coding may use various analog and/or digital filtering techniques to implement the filter banks. Transform coding uses various time-domain to frequency-domain transforms to implement the filter banks. Adjacent frequency-domain transform coefficients may be grouped to define "subbands" having effective bandwidths which are sums of individual transform coefficient bandwidths.

Throughout the following discussion, the term "split-band coding" and the like refers to subband encoding and decoding, transform encoding and decoding, and other encoding and decoding techniques which operate upon portions of the useful signal bandwidth. The term "subband" refers to these portions of the useful signal bandwidth, whether implemented by a true subband coder, a transform coder, or other technique. The term "subband signal" refers to a split-band filtered signal representation within a respective subband.

Lossy compression may include scaling. Many coding techniques including split-band coding convey signals using a scaled representation to extend the dynamic range of encoded information represented by a limited number of bits. A scaled representation comprises one or more "scaling factors" associated with "scaled values" corresponding to elements of the encoded signals. Many forms of scaled representation are known. By sacrificing some accuracy in the scaled values, even fewer bits may be used to convey information using a "block-scaled representation." A block-scaled representation comprises a group or block of scaled values associated with a common scaling factor.

A lossless type of compression reduces information capacity requirements without degradation by reducing or eliminating components of the signal which are redundant. A complementary decompression technique can recover the original signal perfectly by providing the redundant component removed during compression. Examples of lossless compression techniques include run-length encoding, differential coding, linear predictive coding, and transform coding. Variations, combinations and adaptive forms of these compression techniques are also known.

Hybrid techniques combining lossless and lossy compression techniques are also known. For example, split-band coding using a transform-based filter bank combines lossless transform coding with lossy psychoacoustic perceptual coding.

Single-channel coding techniques such as those discussed above do not provide a sufficient reduction in information requirements to permit multiple channels of high-quality audio to be conveyed over low-bandwidth paths, e.g., conventional telephone lines, for real-time playback. Various high-performance coding systems require on the order of 64 k-bits per second or more to convey in real time audio signals having a bandwidth of 15 kHz. Because multiples of these bit rates are required to convey multiple audio channels, impossibly large improvements in the performance of single-channel coding systems are needed to allow multiple channels of audio to be conveyed in real time over limited-bandwidth communication paths such as conventional residential telephone lines. The needed additional reduction in information capacity requirements is addressed by multiple-channel coding techniques referred to herein as spatial coding techniques.

One form of spatial coding combines multiple signals according to an encoding matrix and recovers a replica of the original signals using a complementary decoding matrix. Many 4:2:4 matrixing techniques are known that combine four signals into two signals for transmission or storage and subsequently recover a replica of the four original signals from the two encoded signals. This coding technique suffers from high levels of crosstalk between signals. A number of adaptive matrixing techniques have been developed to reduce the level of crosstalk but neither the reduction in crosstalk nor the reduction in information capacity requirements is sufficient.

Another form of spatial coding splits multiple input signals into subband signals, generates a vector of steering information representing spectral levels of the channels in each subband, combines the subband signals for all channels in a given frequency subband to produce a summation or composite subband signal, perceptually encodes the composite subband signals, and assembles the encoded composite subband signals and the steering vectors into an encoded signal. A complementary decoder generates a subband signal in a respective frequency subband for each output signal by scaling the appropriate composite subband signal according to the steering vector for that subband, and generates an output signal by passing the scaled subband signals through an inverse filter bank. Two examples of such a coding system are disclosed in Davis, et al., U.S. Pat. No. 5,583,962, and in "Coding of Moving Pictures and Associated Audio for Digital Storage Media At Up To About 1.5 Mbit/s," International Organization for Standardization, CD 11172-3, Part 3 (Audio), Annex 3-G (Joint Stereo Coding), pp. G-1 to G-4.

Unfortunately, these spatial coding techniques, even when combined with perceptual coding, do not permit multiple channels of high-quality audio to be conveyed over low-bandwidth paths at a bit rate low enough for real-time playback. When the bit rate is reduced sufficiently, these techniques reproduce replicas of the original input signals with undesirable artifacts such as chirps, clicks and sounds that resemble a zipper being opened or closed ("zipper noise").

DISCLOSURE OF INVENTION

It is an object of the present invention to provide a method and apparatus for encoding multiple audio signals into a low bit-rate encoded signal and for decoding the encoded signal to produce a high-quality replica of the multiple audio signals.

According to the teachings of one aspect of the present invention, an encoder generates a plurality of channel subband signals from a plurality of input signals in a plurality of frequency subbands, generates a composite signal representing at least a portion of the bandwidth of the input signals, generates a spatial-characteristic signal representing spatial characteristics of a soundfield in response to respective channel subband signals in a frequency subband, wherein the spatial-characteristic signal is generated in a first form conveying information representing signal levels of the respective channel subband signals and is generated in a second form representing one or more intended directions, and assembles the composite signal, the spatial-characteristics signal and an indication of the form of the spatial-characteristics signal into an encoded signal.

According to the teachings of another aspect of the present invention, an encoder generates a plurality of channel subband signals from a plurality of input signals in a plurality of frequency subbands, generates a composite signal representing at least a portion of the bandwidth of the input signals, generates a spatial-characteristic signal representing spatial characteristics of a soundfield in response to respective channel subband signals in a frequency subband, the spatial-characteristic signal conveying information representing signal levels of the respective channel subband signals such that decreases in values of the information representing the signal levels are limited to be commensurate with decreases in temporal post-masking characteristics of a human auditory system, and assembles the composite signal and the spatial-characteristics signal into an encoded signal.

According to the teachings of yet another aspect of the present invention, a decoder obtains from an encoded signal one or more composite signals and a plurality of spatial-characteristics signals, and derives a plurality of composite subband signals from the one or more composite signals, wherein each spatial-characteristics signal is associated with a respective composite subband signal and represents spatial characteristics of a respective soundfield corresponding to the respective composite subband signal, derives from the spatial-characteristics signals a plurality of gain factors, wherein decreases in values of the gain factors are limited to be commensurate with decreases in temporal post-masking characteristics of a human auditory system, and maps a respective composite subband signal into one or more interim subband signals according to a respective gain factor, and generates a plurality of output signals by applying one or more inverse filter banks to the interim subband signals.

According to the teachings of a further aspect of the present invention, a decoder obtains from an encoded signal one or more composite signals, a plurality of spatial-characteristics signals and an indication of the form of the spatial-characteristics signals, and derives a plurality of composite subband signals from the one or more composite signals, wherein each spatial-characteristics signal is associated with a respective composite subband signal and represents spatial characteristics of a respective soundfield corresponding to the respective composite subband signal, wherein the indication indicates whether the spatial-characteristics signals are in a first form representing a plurality of signal levels and/or are in a second form representing one or more directions, derives from the spatial-characteristics signals a plurality of gain factors and maps a respective composite subband signal into one or more interim subband signals according to a respective gain factor wherein, for the associated spatial-characteristic signal having the first form, the mapping is also according to a spatial configuration signal associated with the signal levels and a transducer configuration signal representing a spatial configuration of a plurality of output transducers, and wherein, for the associated spatial-characteristic signal having the second form, the mapping is also according to the one or more directions and the transducer configuration signal, and generates a plurality of output signals by applying one or more inverse filter banks to the interim subband signals.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent the scope of the present invention.

MODES FOR CARRYING OUT THE INVENTION

Encoder

Figure 1:
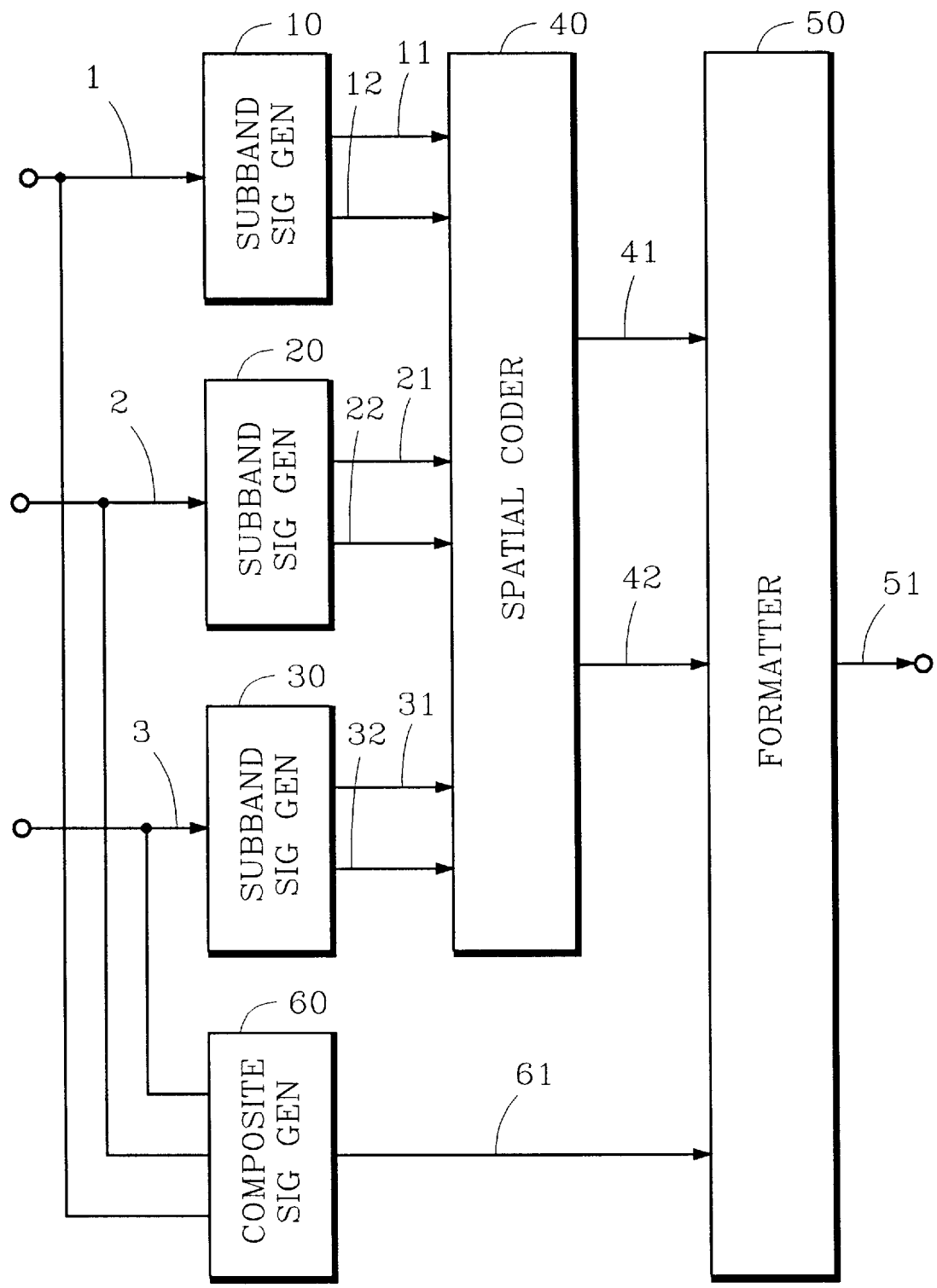
FIGS. 1 and 2 are functional block diagram of two embodiments of multi-channel encoders according to the present invention.

FIG. 1 illustrates one embodiment of a multi-channel encoder according to the present invention. Subband signal generator 10 receives an input signal from path 1 and, in response to that input signal, generates channel subband signals along paths 11 and 12. Similarly, subband signal generator 20 generates channel subband signals along paths 21 and 22 in response to an input signal received from path 2 and subband signal generator 30 generates channel subband signals along paths 31 and 32 in response to an input signal received from path 3. In many practical embodiments, more than two channel subband signals are generated by each subband signal generator.

For many applications, it is anticipated that each subband signal generator will generate channel subband signals representing frequency subbands that span the useful bandwidth of each input signal; however, this is not required to practice the present invention. For example, one or more subband signal generators may generate channel subband signals that represent only a portion of the useful bandwidth, say only the portion of the bandwidth below about 1.5 kHz. Generally, channel subband signals should be generated for all input signals in that portion of the spectrum that will be analyzed by spatial coder 40 to determine soundfield spatial characteristics.

Spatial coder 40 generates spatial-characteristic signals along paths 41 and 42 in response to the channel subband signals received from the subband signal generators. Each of these spatial-characteristic signals represent the spatial characteristic of a soundfield that corresponds to one or more channel subband signals in a respective frequency subband. Composite signal generator 60 generates a composite signal along path 61 by combining the input signals received from paths 1, 2 and 3.

Although it is anticipated that the present invention will be used in conjunction with some type of data compression such as perceptual coding, data compression is not required to practice the present invention. If data compression is used, essentially any form of data compression may be applied to the composite signal generated along path 61.

Formatter 50 assembles the spatial-characteristic signals received from paths 41 and 42 and the composite signal received from path 61 into an output signal that is passed along path 51 for transmission or storage. If the composite signal is subjected to data compression or encoding, the encoded form is assembled into the output signal rather than the composite signal itself.

Figure 2:
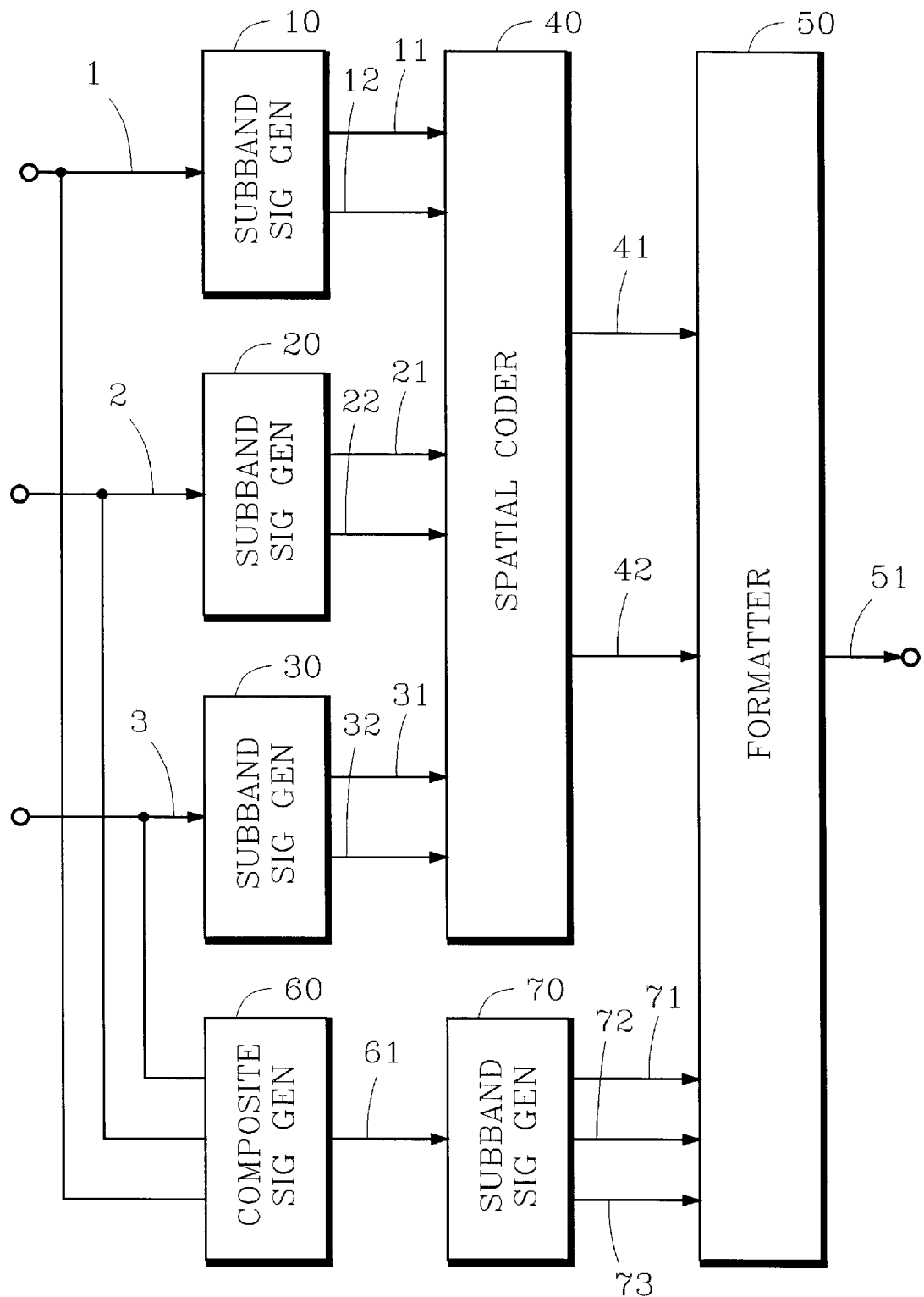

FIG. 2 illustrates another embodiment of a multi-channel encoder according to the present invention. This embodiment is identical to the embodiment illustrated in FIG. 1 except for the addition of subband signal generator 70 which generates composite subband signals along paths 71 to 73 in response to the composite signal received from path 61.

If data compression is used in this second embodiment, it may be applied to these composite subband signals. In particular, perceptual coding techniques may be applied to good advantage if the bandwidth of the composite subband signals is commensurate with the critical bandwidths. It should be pointed out that the bandwidths of the composite subband signals generated by subband signal generator 70 do not have to be the same as the bandwidths of the channel subband signals generated by subband signal generators 10, 20 and 30. Indeed, even the bandwidths of the channel subband signals generated by subband signal generators 10, 20 and 30 do not have to be the same.

Various techniques may be used to implement the several subband signal generators. For example, nonrecursive, recursive, or lattice filters may be used. Some nonrecursive filters may be implemented using polynomial filters or transforms. Examples of specific filter designs include various transforms such as the Discrete Fourier Transform (DFT) and Discrete Cosine Transform (DCT), the Quadrature Mirror Filter (QMF), and the so called evenly-stacked and oddly-stacked Time-Domain Aliasing Cancellation (TDAC) transforms. The analysis properties of the transforms is affected by the shape of any window function that is used to modulate a block of signal samples prior to application of a transform.

The analysis properties of the various subband signal generators used in any of the embodiments do not have to be identical. For example, subband signal generators 10, 20 and 30 preferably incorporate identical filter banks that are designed to optimize spectral resolution and which provide an accurate measure of subband signal power. In subband signal generator 70, however, the filter bank may be selected to optimize data compression by providing critical sampling and by balancing a tradeoff between spectral resolution and temporal resolution.

Figure 3:
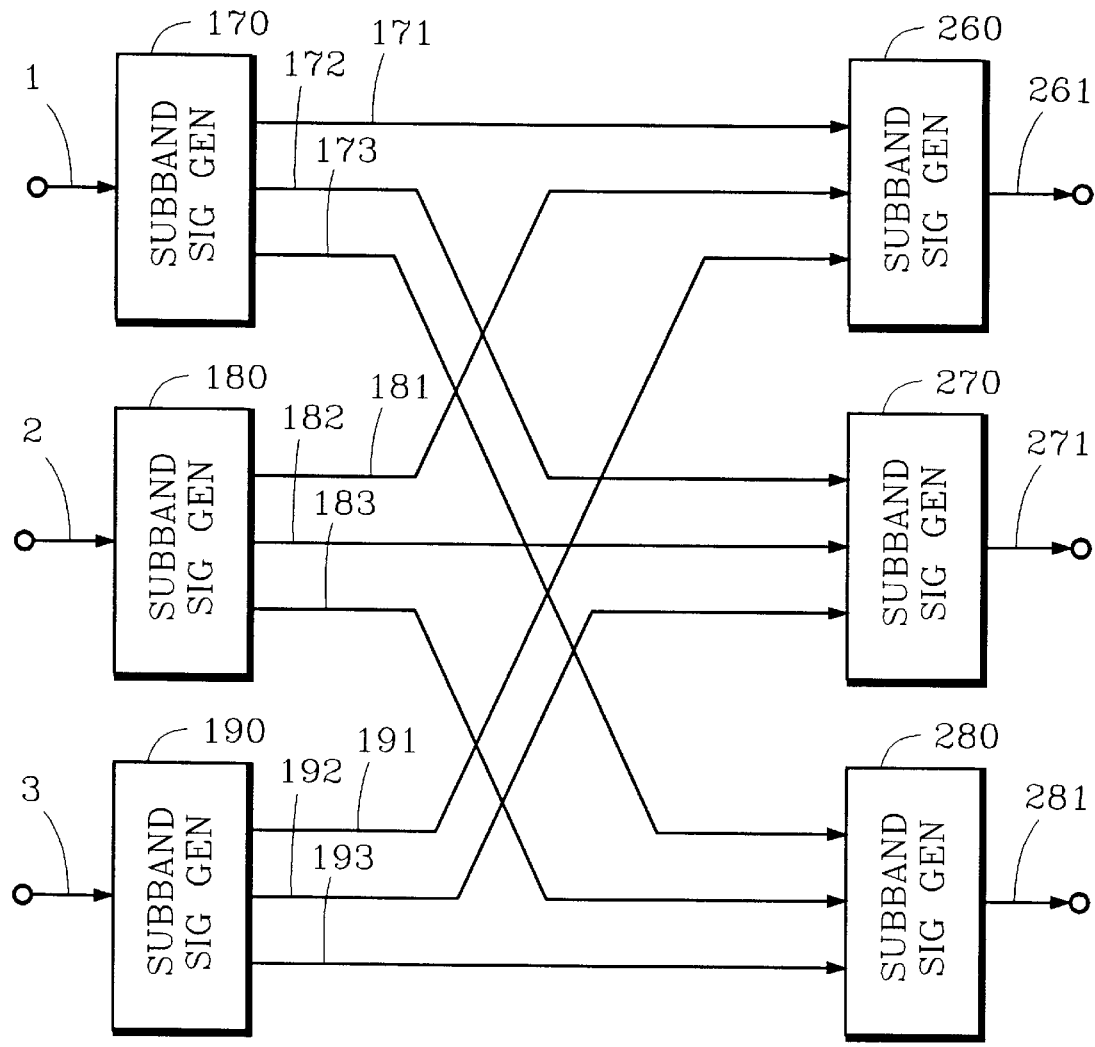
FIG. 3 is a functional block diagram of one embodiment of a composite signal generator according to the present invention.

FIG. 3 illustrates an embodiment of a composite signal generator that can be incorporated into an encoder such as that illustrated in FIG. 1. In this embodiment, subband signal generator 170 generates subband signals along paths 171 to 173 in response to the input signal received from path 1. Similarly, subband signal generator 180 generates subband signals along paths 181 to 183 in response to the input signal received from path 2 and subband signal generator 190 generates subband signals along paths 191 to 193 in response to the input signal received from path 3. Subband signal generator 260 generates composite subband signals along paths 261 in response to the subband signals received from paths 171, 181 and 191. Similarly, subband signal generator 270 generates a composite subband signal along path 271 in response to the subband signals received from paths 172, 182 and 192, and subband signal generator 280 generates a composite subband signal along path 281 in response to the subband signals received from paths 173, 183 and 193. In one embodiment, subband signal generators 260, 270 and 280 generate the composite subband signals by forming a sum of the subband signals received from subband signal generators 170, 180 and 190. Alternative ways of forming composite subband signals are discussed below. The way in which the composite subband signals are generated is not critical to the practice of the present invention, and they may be subjected to some form of data compression.

Figure 4:
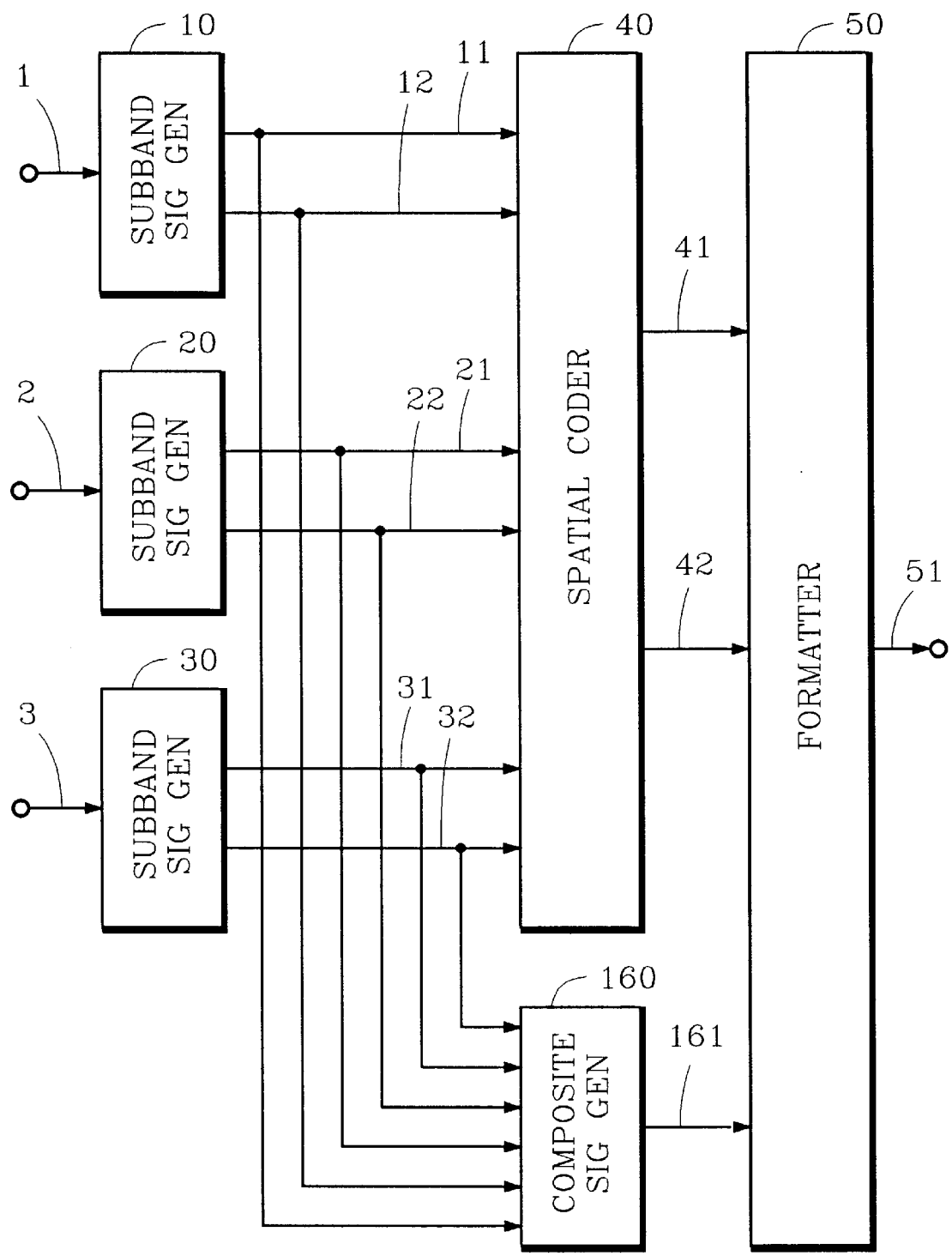
FIG. 4 is a functional block diagram of another embodiment of a multi-channel encoder according to the present invention.

FIG. 4 illustrates another embodiment of a multi-channel encoder according to the present invention. This embodiment is identical to the embodiment illustrated in FIG. 1 except that composite signal generator 160 generates one or more composite signals along path 161 in response to the channel subband signals generated by subband signal generators 10, 20 and 30. In one embodiment, composite signal generator 160 combines channel subband signals in a given frequency subband for each input signal to generate a composite subband signal for that frequency subband. The one or more composite signals generated along path 161 may be subjected to some form of data compression.

Decoder

Figure 5:
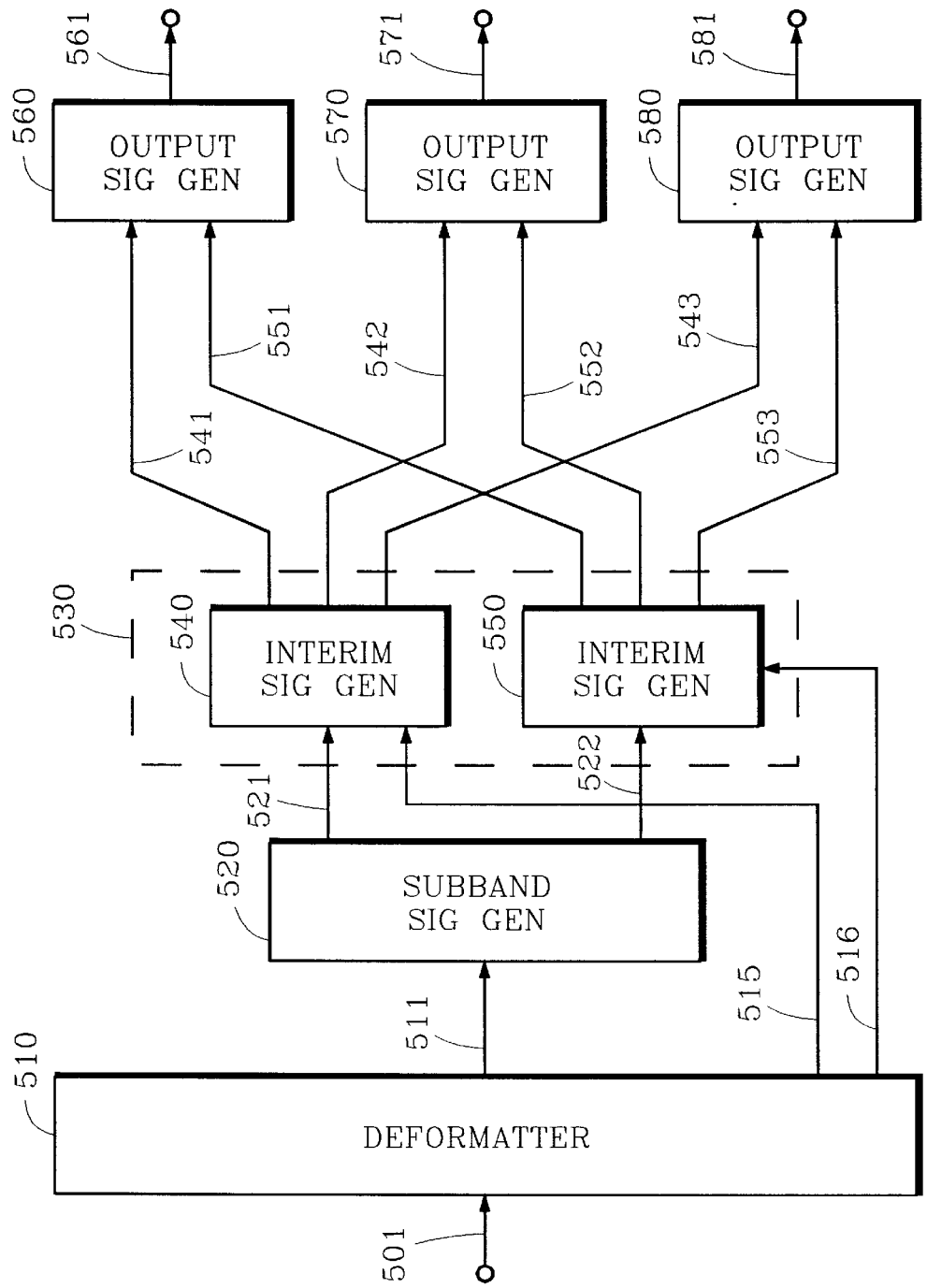
FIGS. 5 and 6 are functional block diagrams of two embodiments of multi-channel decoders according to the present invention.

FIG. 5 illustrates one embodiment of a multi-channel decoder according to the present invention. Deformatter 510 extracts one or more composite signals and spatial-characteristic signals from the encoded signal received from path 501. In the embodiment shown, a composite signal is passed along path 511 and spatial-characteristic signals are passed along paths 515 and 516. Subband signal generator 520 generates composite subband signals along paths 521 and 522 in response to the composite signal received from path 511. Spatial decoder 530 derives a plurality of gain factors from the spatial-characteristics signals received from paths 515 and 516 and uses those gain factors to map the composite subband signals into one or more interim subband signals. Interim signal generator 540 generates interim subband signals along paths 541, 542 and 543, and interim signal generator 550 generates interim subband signals along paths 551, 552 and 553. Output signal generator 560 generates an output signal along path 561 in response to the interim subband signals received from paths 541 and 551. Similarly, output signal generator 570 generates an output signal along path 571 in response to interim subband signals received from paths 542 and 552, and output signal generator 580 generates an output signal along path 581 in response to interim subband signals received from paths 543 and 553.

In all embodiments of decoders shown in the figures, each interim subband signal is mapped into all output signals; however, this is not necessary. A given interim subband signal need not be mapped into all output signals.

If the composite signal extracted from the encoded signal has been subjected to data compression, a complementary form of data expansion may be applied as necessary to the signal passed along path 511 and/or to the subband signals passed along paths 521 and 522.

Various filtering and transformation techniques such as those discussed above may be used to implement subband signal generator 520. A complementary or inverse technique is used to implement the output signal generators.

Figure 6:
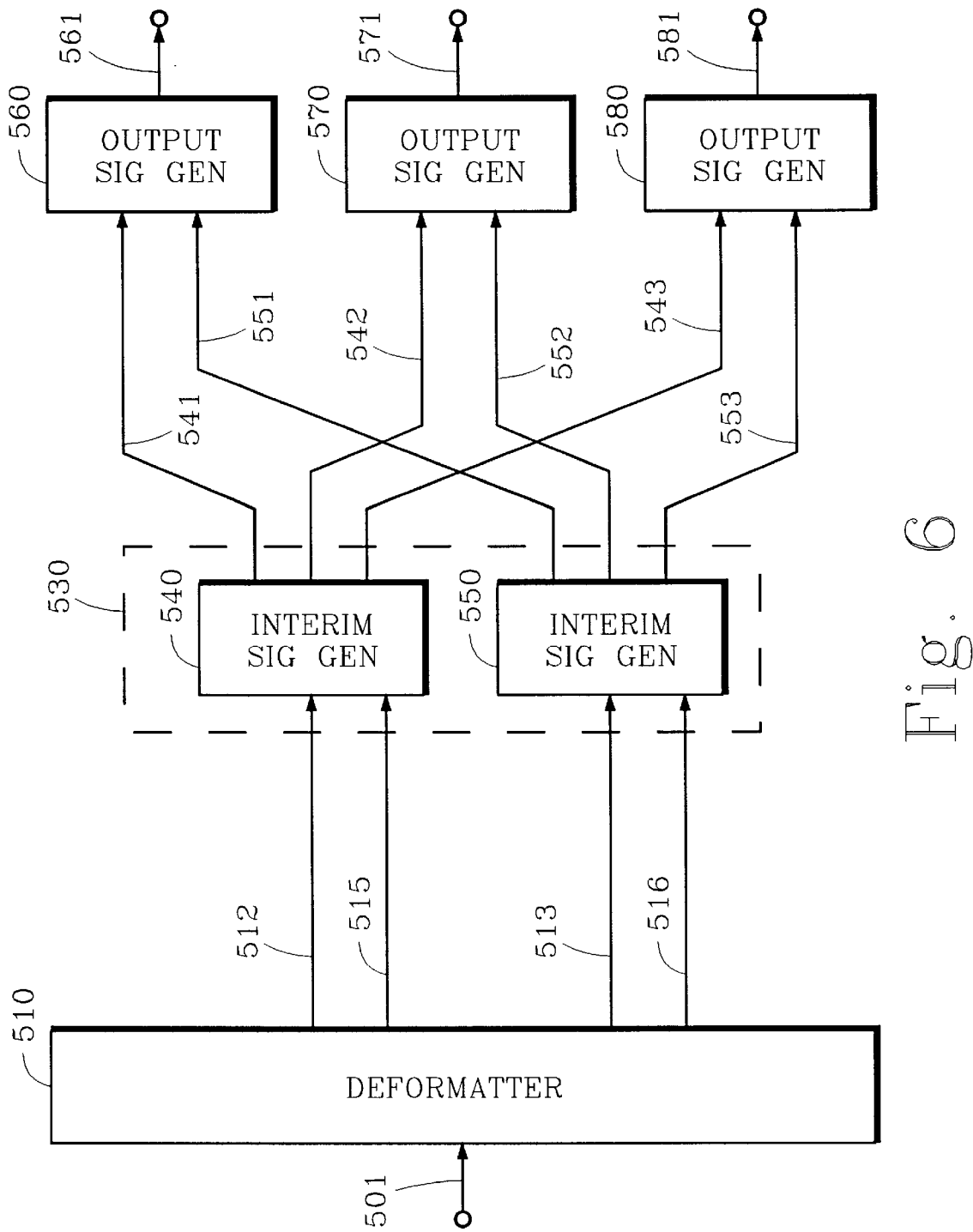

FIG. 6 illustrates another embodiment of a multi-channel decoder according to the present invention. This embodiment is identical to the embodiment illustrated in FIG. 5 except that deformatter 510 extracts the composite subband signals directly from the encoded signal and passes those signals along paths 512 and 513. Data expansion may be applied to the composite subband signals as necessary. The inverse filtering or inverse transformation technique used to implement the output signal generators should be complementary to the filtering or transformation technique used to generate the composite subband signals that were assembled into the encoded signal.

Generation of Spatial-Characteristics Signals

An encoder according to the present invention may generate spatial-characteristics signals in either or both of two forms. A first form in one embodiment, referred to herein as a Type I signal, represents some measure of signal level for each channel subband signal that contributes to the soundfield. The measure of signal level may be peak amplitude, average amplitude or root-mean-square (RMS), for example. In another embodiment, the Type I signal represents some measure of signal level for each "virtual" channel subband signal that contributes to the soundfield. A virtual channel need not exist as a physical entity but may be a conceptual entity representing, for example, a weighted sum or other combination of signals from two or more physical channels. The essential aspect is that the number of elements in the spatial-characteristics signal need not be equal to the number of actual physical channels that contribute to the soundfield.

A second form, referred to herein as a Type II signal, represents one or more apparent directions for the soundfield and possibly some indication of soundfield width or dispersal characteristics about the directions. A direction may be represented by a vector in a three- or two-dimensional space, for example.

In a system for encoding a composite signal representing five input channels, for example, a Type I spatial characteristics signal for a respective frequency subband comprises five measures of signal level, say power, a measure for each input channel in that frequency subband. In that same system, a Type II spatial-characteristics signal for a respective frequency subband comprises a representation of one or more directions. In embodiments representing only one direction in each frequency subband, for example, the Type II signal for each subband could be expressed as a vector in Cartesian coordinates or polar coordinates for a two- or three-dimensional space.

The information capacity requirements of the Type II signal is independent of the number of input channels; however, the process that generates this type of spatial-characteristics signal must be informed of the number and location for the sound source represented by each input channel so that the soundfield direction can be correctly determined.

In one embodiment, an encoder generates spatial-characteristics signals for a respective frequency subband in either or both of the two types. The choice can be based on essentially any criterion such as required audio quality, output channel bandwidth and/or number of apparent directions. Type II signals might be used in multi-channel systems having lower channel bandwidths since fewer bits are generally needed to encode a Type II signal as opposed to the number of bits needed to encode a Type I signal. If the sound field for a respective subband is deemed to have a number of directions greater than some threshold number, however, a Type I signal might require fewer bits.

For example, suppose several channels of audio information representing a large orchestra are to be reproduced with high quality and another channel of audio information representing a single mosquito flying about the orchestra can be reproduced with less quality. The spatial-characteristics signals for the subband signals representing the orchestra could be formed in the first form and the spatial characteristics signals for the subband signals representing the mosquito could be formed in the second form.

As the number of apparent directions for a soundfield increases, the number of bits required to convey a Type II signal increases; therefore, a Type I spatial-characteristics signal is generally preferred for a subband as the number of apparent directions for the soundfield in that subband increases. If only one channel has significant spectral energy in a frequency subband, the number of apparent directions for the soundfield in that subband is deemed to be one. The number of apparent directions is also deemed to be one if more than one channel has significant energy in a respective subband provided the amplitudes and phases of the channels in that subband are correlated so as to represent a single sound source.

The relationship between channel subband signals and spatial-characteristic signals does not need to be the same for every frequency subband. Furthermore, the relationship does not need to be fixed but can vary in response to various considerations such as input signal characteristics or output channel bandwidth. In a simple embodiment, a respective spatial-characteristic signal is generated for each frequency subband and represents the spatial characteristics of a soundfield corresponding to all channel subband signals in that subband.

In another example for the embodiments shown in FIGS. 1, 2 and 4, the spatial-characteristic signal generated along path 41 represents the spatial characteristic of a soundfield corresponding to the channel subband signals received from paths 11, 21 and 31, and the spatial-characteristic signal generated along path 42 represents the spatial characteristic of a soundfield corresponding to the channel subband signals received from paths 12 and 32. In a variation of this example, another spatial-characteristic signal is generated to represent the spatial characteristics of a soundfield corresponding to the channel subband signal received from path 22.

In yet another example, an encoder adaptively forms spatial-characteristic signals in either or both of the two forms described above. The adaptation can be based on the number of apparent directions deemed to be represented in a frequency subband, the perceived width of the apparent directions, and/or the number of bits that are available to convey the spatial-characteristics signal. In a preferred embodiment, the form chosen to represent the spatial-characteristic signals provides the best tradeoff between information capacity requirements and aural quality.

In some applications, the information capacity requirements of the spatial-characteristics signals can be reduced by limiting the temporal rate at which the signals can change. For Type I signals, temporal smoothing is applied to limit the rate at which the spectral level measures can change. Temporal smoothing can be applied to limit both increases and decreases in these measures; however, it is anticipated that temporal smoothing of decreases is generally more effective and less obtrusive than temporal smoothing of increases. For Type II signals, temporal smoothing is applied to limit the rate at which directional vectors can change orientation in space. Information capacity requirements can be reduced in many ways.

By applying temporal smoothing, the spatial-characteristics signals can be encoded with fewer bits because the elements of those signals can be encoded and transmitted less often. A decoder can recover the omitted elements using interpolation or some other form of filtering. Furthermore, when differential coding is used, the number of bits needed to represent the signals can be reduced because temporal smoothing limits the dynamic range of differentials between successive values; hence, fewer bits are required to represent the differential codes.

Generally, the extent to which temporal smoothing is used is based on the temporal masking characteristics of the human auditory system. For example, rates of change that allow decreases in level to fall below the post-temporal masking threshold can be reduced without perceptible effect provided the resultant levels do not exceed that masking threshold. In some embodiments, rates of change are limited to not exceed about 120 to 140 dB per sec. In another embodiment, limits to the rate of increase are relaxed for events that are deemed to be a transient.

A transient may be detected in many ways. For example, a transient may be deemed to have occurred if an increase in amplitude of various signals within a short time interval, say 10 msec., exceeds a threshold, say 10 dB. Examples of such signals include the input signals, the composite signal, one or more channel subband signals or composite subband signals, especially subband signals for higher frequency subbands. Various measures of spectral content for successive time intervals may also be compared. For example, a weighted sum of transform coefficients that emphasizes the higher-frequency coefficients may be compared for adjacent transform blocks.

In some applications, the information capacity requirements of the spatial-characteristics signals can be reduced by limiting the spectral rate at which the signals differ across the spectrum. For Type I signals, spectral smoothing is applied to limit the difference between respective signal level measures in adjacent subbands. This technique can be used to good effect in embodiments that use differential coding to represent the spatial-characteristics signals across the subbands. By imposing a limit on how much information can change from one subband to another, the dynamic range of the change between values can be reduced to a point where fewer bits are required to represent the differential codes. In many embodiments, the limits in the amount of change are inherently imposed by spectral leakage between adjacent subbands in the filter bank or transform used to generate the channel subband signals. A more detailed discussion of spectral smoothing as applied to the encoding of a spectral envelope may be obtained from U. S. Pat. No. 5,581,653.

Information requirements can also be reduced by increasing the length of blocks used in various block coding schemes like block scaling and transform coding. Unfortunately, because such increases in block length also reduce the temporal resolution of the coding process, the temporal disparity between the spatial-characteristics signal and the underlying soundfield also increases. The effects of this error can be reduced by including in the encoded signal an indication of where in a block a significant change in spatial characteristics occurs. In effect, the indication represents an amount of delay between the beginning of a block and the onset of the spatial change. The complementary decoding feature is discussed below.

Composite Signal and Composite Subband Signals

One or more composite signals may be formed in an encoder and subsequently split into composite subband signals in a decoder. See the discussion above in connection with FIG. 5. Alternatively, the composite subband signals may be formed in an encoder and merely extracted from the encoded signal by a decoder. See the discussion above in connection with FIG. 6. Neither method is critical to the practice of the present invention.

Signals may be combined in a variety of ways to form the composite signals and composite subband signals. One way that signals may be combined is to add corresponding digital samples from each channel to form a simple summation signal or, alternatively, to add weighted representations of samples from each channel to form a more complex summation signal. Another way is to take the square root of the sum of the squares of corresponding samples from each channel to form a RMS signal.

Yet another way of forming a composite signal is to generate parametric signals such as signals conforming to the Musical Instrument Digital Interface (MIDI) standard, or signals that convey pitch period and spectral envelope or a set of filter parameters and corresponding excitation signal like those generated by a wide range of vocoders. Appropriate signals are synthesized in a decoder from the parametric signals. Inasmuch as the generation of parametric signals is just another form of data compression, it should be appreciated that no particular technique is critical to the practice of the present invention.

Normalization

In situations where an encoder generates and encodes composite subband signals, the information capacity requirements of the composite subband signals and the corresponding Type I spatial-characteristics signals can be reduced by normalizing each composite subband signal according to the largest element in the respective spatial-characteristics signal.

For example, suppose a Type I signal conveys RMS measures of signal power in a particular frequency subband i for subband signals from left, right and center channels. In this example, the measures of power for the subband signals from the left, right and center channels are 0.4, 0.8 and 0.1, respectively, and the measure of power for a composite subband signal obtained by combining subband signals from the three channels is 1.2. The composite subband signal is scaled by the ratio R of the measures for the largest channel subband signal in that particular frequency subband to the composite subband signal, or $$R = \frac{0.8}{1.2} = \frac{2}{3}$$

The net effect is that the measure of signal level for the composite subband signal is scaled to the same level as the largest channel subband signal which, in this example, is the subband signal from the right channel. The scaled composite subband signal may be encoded as desired. The Type I spatial-characteristics signal for the particular frequency subband comprises a vector of three elements representing the signal levels for each channel subband signals scaled to the maximum signal level. In this example, the spatial-characteristics signal vector V has elements with the values $$V = \left( \frac{0.4}{0.8}, \frac{0.8}{0.8}, \frac{0.1}{0.8} \right) = (0.5, 1.0, 0.125)$$

representing the relative levels for the left, right and center channel subband signals, respectively. This vector may be encoded as desired. In one embodiment, the vector is encoded into a form in which each element expresses one of five levels: 0 dB, −3 dB, −7 dB, −10 dB, and "off." In other embodiments, the vector elements may express a different number of levels.

Derivation and Use of Gain Factors

As explained above with reference to the embodiments shown in FIGS. 5 and 6, spatial decoder 530 derives a plurality of gain factors from the spatial-characteristics signals. Those gain factors are used to map the composite subband signals into one or more interim subband signals. The derivation of the gain factors may be done in a number of ways which depend on what types of spatial-characteristics signals are used and the number and orientation of the output channels.

As a simple example, in a coding system using Type I spatial-characteristics signals where the number and orientation of output channels is the same as the number and orientation of input channels, the gain factors may be derived in a straight-forward manner from the measure of signal levels conveyed in the spatial-characteristics signals. If a Type I spatial-characteristics signal for a respective frequency subband conveys measures of power for each input channel, the gain factor for each output channel would be proportional to the corresponding level in the Type I signal.

If the number and/or orientation of input and output channels differ, however, the derivation is more complex. One possible derivation of gain factors for a particular frequency subband forms a vector for each input channel, each vector having an orientation representing the spatial orientation of the respective input channel and having a length according to the respective measure of signal level conveyed in the Type I spatial-characteristics signal. Each of these vectors is then projected onto an axis having an orientation representing the spatial orientation of a respective output channel. The gain factor for each output channel is derived from the sum of the projections onto the corresponding axis.

A similar derivation of gain factors may be carried out for Type II spatial-characteristics signals. A principal difference, however, is that the spatial orientation of the input channels need not be known to the decoder.

In coding systems that adaptively switch between the two types of spatial-characteristics signals, the derivation of the gain factors also adaptively switches as necessary.

After the gain factors have been derived, one or more interim signals for a particular frequency subband are generated by applying a respective gain factor to the appropriate composite subband signal. In effect, an interim subband signal for output an channel in a frequency subband is generated by multiplying the composite subband signal in that subband by the appropriate gain factor, or $IS_{ij} = g_{ij} \cdot XS_j$ where $IS_{ij}$=interim subband signal for channel i in frequency subband j;

$g_{ij}$=gain factor derived for channel i in frequency subband j; and $XS_j$=composite subband signal in frequency subband j.

An output channel subband signal in a given frequency subband for respective output channel is obtained by summing all the interim signals in that frequency subband. As described above, the output signal itself is obtained by applying an inverse or synthesis filter to the output channel subband signals for that output channel.

In multi-channel playback systems, subband signals in one or more frequency subbands for a particular channel may drop out or go to zero. In effect, the coding system determined that no sonic energy was needed in that particular channel and frequency subband to present a particular aural effect. To the extent these drop outs can be introduced without degrading a desired perceptual effect, they demonstrates a gain in coding efficiency achieved by the present invention.

It has been found that in many cases such temporal smoothing can reduce chirps, zipper noise and other spatial coding artifacts in the recovered signal. In preferred embodiments, changes in the values of the gain factors are limited according to the temporal masking characteristics of the human auditory system. For example, rates of change that allow decreases in level of the output channel subband signal to fall below the post-temporal masking threshold can be reduced without perceptible effect provided the resultant levels do not exceed that masking threshold. In some embodiments, rates of change are limited to not exceed about 120 to 140 dB per sec. In another embodiment, limits to the rate of increase are relaxed for events that are deemed to be a transient. Transients can be detected in a variety of ways including those discussed above.

In some embodiments, the quality of the reproduced signals can be improved by limiting the spectral rate at which the gain factors change across the spectrum. This technique is especially effective for coding systems using analysis/synthesis filter banks in which an overlap of the frequency response characteristics in adjacent subbands of the synthesis filter bank is used to cancel aliasing artifacts. Some well known examples are QMF and the TDAC transforms. The aliasing cancellation properties of such filtering systems is degraded if the signals in adjacent subbands are subject to very different gains. By controlling the amount by which gains in adjacent subbands may differ, the impairment in aliasing cancellation can be controlled. In preferred embodiments using aliasing-cancellation filtering systems, differences in gains between adjacent subbands for a given output signal are limited such that uncancelled aliasing artifacts are rendered substantially inaudible.

As discussed above, embodiments of block-coding systems may also include an indication of when a significant event occurs in a block. For example, an encoder may include in an encoded signal a indication of delay between the beginning of a block and the onset of an event such as a transient or abrupt change in direction. In response to such an indication, a decoder may apply changes to one or more signals in the time domain. In embodiments using digital filters, these changes may be applied to essentially any signal throughout the decoding process from signal deformatting to output signal generation. In embodiments using block transforms, these changes may be applied to composite signal 511 prior to subband signal generation, and/or they may be applied to output signals obtained from one or more inverse filter banks.

We claim:

1. A method for generating an encoded signal by encoding a plurality of input signals each representing a respective channel of audio information, said method comprising:

generating a plurality of channel subband signals representing said input signals in a plurality of frequency subbands, generating a composite signal representing at least a portion of the bandwidth of said input signals, generating a spatial-characteristic signal representing spatial characteristics of a soundfield associated with said composite signal in response to respective channel subband signals in a frequency subband, wherein said spatial-characteristic signal is generated in either or both of a first form conveying information representing signal levels of said respective channel subband signals and a second form representing one or more intended directions, wherein the forms in which to generate said spatial-characteristics signal are determined adaptively, and assembling said composite signal, said spatial-characteristics signal and an indication of the form of said spatial-characteristics signal into said encoded signal.

2. A method according to claim 1 where, in response to said respective channel subband signals in a respective frequency subband, said spatial-characteristics signal is generated in said first form if said soundfield is deemed to have a number of apparent directions greater than a threshold number.

3. A method according to claim 2 wherein said threshold number is one and said soundfield is deemed to have one apparent direction when only one of said respective channel subband signals has significant spectral energy or when all of said respective channel subband signals having significant spectral energy also have correlated amplitudes and correlated phases.

4. A method according to claim 1 wherein said respective spatial-characteristics signal is generated in said second form such that it also represents a measure of soundfield dispersion about an intended direction.

5. A method according to claim 1 wherein said spatial-characteristics signal is generated in said first form such that rates of decrease in values of said information representing said signal levels are limited to be commensurate with temporal post-masking characteristics of a human auditory system.

6. A method for generating an encoded signal by encoding a plurality of input signals each representing a respective channel of audio information, said method comprising:

generating a plurality of channel subband signals representing said input signals in a plurality of frequency subbands, generating a composite signal representing at least a portion of the bandwidth of said input signals, generating a spatial-characteristic signal representing spatial characteristics of a soundfield associated with said composite signal in response to respective channel subband signals in a frequency subband, wherein rates of change in said spatial-characteristic signal are limited to be commensurate with temporal post-masking characteristics of a human auditory system, and assembling said composite signal and said spatial-characteristics signal into said encoded signal.

7. A method according to claim 1 or 6 wherein said composite signal is generated by combining two or more channel subband signals in a respective frequency subband.

8. A method according to claim 1 or 6 wherein said composite signal is a subband signal that is generated by applying a filter bank or a transform to a wideband signal, wherein said wideband signal is formed by combining two or more of said input signals.

9. A method according to claim 1 or 6 wherein said composite signal is generated by combining subband signals that are obtained by applying a filter bank or a transform to two or more of said input signals.

10. A method according to claim 1 or 6 wherein said composite signal is a parametric signal.

11. A method according to claim 6 wherein said spatial-characteristic signal represents one or more intended directions and rates of change in the spatial-characteristic signal are limited to control a rate at which said intended directions can change orientation.

12. A method according to claim 6 wherein said spatial-characteristic signal conveys information representing signal levels of said respective channel subband signals and said rates of change in the spatial-characteristic signal correspond to rates of decrease in values of said information representing the signal levels.

13. A method according to claim 1 or 6 wherein each of said respective channel subband signals is generated in response to a common time interval of said input signals, and wherein said method further comprises generating a delay signal indicating where in said common time interval an abrupt change in amplitude or direction occurs in said respective soundfield, and assembling said delay signal into said encoded signal.

14. A method according to claim 1 or 6 wherein said composite signal is a subband signal that corresponds to a respective frequency subband, and wherein said method further comprises normalizing information conveyed by said composite signal with respect to a measure of signal level for a channel subband signal in that respective frequency subband having the largest measure.

15. A method according to claim 1 or 6 that further comprises generating a differential-encoded representation of said spatial-characteristics signals corresponding to a plurality of adjacent frequency subbands, wherein said differential-encoded representation comprises one or more codes having a dynamic range that is limited according to spectral leakage characteristics between said channel subband signals in adjacent frequency subbands.

16. A method for decoding an encoded signal to generate one or more output signals for presentation via one or more output transducers, said method comprising:

obtaining from said encoded signal one or more composite signals and a plurality of spatial-characteristics signals, and deriving a plurality of composite subband signals from said one or more composite signals, wherein each spatial-characteristics signal is associated with a respective composite subband signal and represents spatial characteristics of a respective soundfield corresponding to said respective composite subband signal, deriving from said spatial-characteristics signals a plurality of gain factors, wherein rates of change in values of said gain factors are limited to be commensurate with temporal post-masking characteristics of a human auditory system, and mapping a respective composite subband signal into one or more interim subband signals according to a respective gain factor, and generating said plurality of output signals by applying one or more inverse filter banks to said interim subband signals.

17. A method for decoding an encoded signal to generate one or more output signals for presentation via one or more output transducers, said method comprising:

obtaining from said encoded signal one or more composite signals, a plurality of spatial-characteristics signals and an indication of the form of said spatial-characteristics signals, and deriving a plurality of composite subband signals from said one or more composite signals, wherein each spatial-characteristics signal is associated with a respective composite subband signal and represents spatial characteristics of a respective soundfield corresponding to said respective composite subband signal, wherein said indication indicates whether said spatial-characteristics signals are in a first form representing a plurality of signal levels and/or are in a second form representing one or more directions, deriving from said spatial-characteristics signals a plurality of gain factors and mapping a respective composite subband signal into one or more interim subband signals according to a respective gain factor wherein, for said associated spatial-characteristic signal having said first form, said mapping is also according to a spatial configuration signal associated with said signal levels and a transducer configuration signal representing a spatial configuration of said output transducers, and wherein, for said associated spatial-characteristic signal having said second form, said mapping is also according to said one or more directions and said transducer configuration signal, and generating said plurality of output signals by applying one or more inverse filter banks to said interim subband signals.

18. A method according to claim 17 wherein rates of decrease in values of said gain factors are limited to be commensurate with temporal post-masking characteristics of a human auditory system.

19. A method according to claim 16 or 17 wherein said composite subband signals are derived by applying a filter bank or a transform to said one or more composite signals.

20. A method according to claim 16 or 17 wherein said composite signal is a parametric signal and said deriving comprises generating a spectral or a temporal signal in response thereto.

21. A method according to claim 16 or 17 that further comprises obtaining from said encoded signal a delay signal and delaying the mapping of said respective composite signal in response to said delay signal.

22. A method according to claim 16 or 17 wherein said interim subband signals have bandwidths that are commensurate with the critical-band bandwidths of a human auditory system.

23. A method according to claim 16 or 17 wherein said output signals are generated by applying an inverse filter bank having aliasing cancellation properties or by applying an inverse transform having aliasing cancellation properties, and wherein said mapping limits differences between levels of said interim subband signals in adjacent frequency subbands such that noise resulting from incomplete aliasing cancellation is rendered substantially inaudible.

24. A medium readable by a machine, embodying a program of instructions executable by said machine to perform a method for generating an encoded signal by encoding a plurality of input signals each representing a respective channel of audio information, said method comprising:

generating a plurality of channel subband signals representing said input signals in a plurality of frequency subbands, generating a composite signal representing at least a portion of the bandwidth of said input signals, generating a spatial-characteristic signal representing spatial characteristics of a soundfield associated with said composite signal in response to respective channel subband signals in a frequency subband, wherein said spatial-characteristic signal is generated in either or both of a first form conveying information representing signal levels of said respective channel subband signals and in a second form representing one or more intended directions, wherein the forms in which to generate said spatial-characteristics signal are determined adaptively, and assembling said composite signal, said spatial-characteristics signal and an indication of the form of said spatial-characteristics signal into said encoded signal.

25. A medium according to claim 24 wherein said method is such that, in response to said respective channel subband signals in a respective frequency subband, said spatial-characteristics signal is generated in said first form if said soundfield is deemed to have a number of apparent directions greater than a threshold number.

26. A medium according to claim 25 wherein said method is such that said threshold number is one and said soundfield is deemed to have one apparent direction when only one of said respective channel subband signals has significant spectral energy or when all of said respective channel subband signals having significant spectral energy also have correlated amplitudes and correlated phases.

27. A medium according to claim 24 wherein said method is such that said respective spatial-characteristics signal is generated in said second form such that it also represents a measure of soundfield dispersion about an intended direction.

28. A medium according to claim 24 wherein said method is such that said spatial-characteristics signal is generated in said first form such that rates of decrease in values of said information representing said signal levels are limited to be commensurate with temporal post-masking characteristics of a human auditory system.

29. A medium readable by a machine, embodying a program of instructions executable by said machine to perform a method for generating an encoded signal by encoding a plurality of input signals each representing a respective channel of audio information, said method comprising:

generating a plurality of channel subband signals representing said input signals in a plurality of frequency subbands, generating a composite signal representing at least a portion of the bandwidth of said input signals, generating a spatial-characteristic signal representing spatial characteristics of a soundfield associated with said composite signal in response to respective channel subband signals in a frequency subband, wherein rates of change in said spatial-characteristic signal are limited to be commensurate with temporal post-masking characteristics of a human auditory system, and assembling said composite signal and said spatial-characteristics signal into said encoded signal.

30. A medium according to claim 24 or 29 wherein said method is such that said composite signal is generated by combining two or more channel subband signals in a respective frequency subband.

31. A medium according to claim 24 or 29 wherein said method is such that said composite signal is a subband signal that is generated by applying a filter bank or a transform to a wideband signal, wherein said wideband signal is formed by combining two or more of said input signals.

32. A medium according to claim 24 or 29 wherein said method is such that said composite signal is generated by combining subband signals that are obtained by applying a filter bank or a transform to two or more of said input signals.

33. A medium according to claim 24 or 29 wherein said method is such that said composite signal is a parametric signal.

34. A medium according to claim 29 wherein said method is such that said spatial-characteristic signal represents one or more intended directions and rates of change in the spatial-characteristic signal are limited to control a rate at which said intended directions can change orientation.

35. A medium according to claim 29 wherein said method is such that said spatial-characteristic signal conveys information representing signal levels of said respective channel subband signals and said rates of change in the spatial-characteristic signal correspond to rates of decrease in values of said information representing the signal levels.

36. A medium according to claim 24 or 29 wherein said method is such that each of said respective channel subband signals is generated in response to a common time interval of said input signals, and wherein said method further comprises generating a delay signal indicating where in said common time interval an abrupt change in amplitude or direction occurs in said respective soundfield, and assembling said delay signal into said encoded signal.

37. A medium according to claim 24 or 29 wherein said method is such that said composite signal is a subband signal that corresponds to a respective frequency subband, and wherein said method further comprises normalizing information conveyed by said composite signal with respect to a measure of signal level for a channel subband signal in that respective frequency subband having the largest measure.

38. A medium according to claim 24 or 29 wherein said method further comprises generating a differential-encoded representation of said spatial-characteristics signals corresponding to a plurality of adjacent frequency subbands, wherein said differential-encoded representation comprises one or more codes having a dynamic range that is limited according to spectral leakage characteristics between said channel subband signals in adjacent frequency subbands.

39. A medium readable by a machine, embodying a program of instructions executable by said machine to perform a method for decoding an encoded signal to generate one or more output signals for presentation via one or more output transducers, said method comprising:

obtaining from said encoded signal one or more composite signals and a plurality of spatial-characteristics signals, and deriving a plurality of composite subband signals from said one or more composite signals, wherein each spatial-characteristics signal is associated with a respective composite subband signal and represents spatial characteristics of a respective soundfield corresponding to said respective composite subband signal, deriving from said spatial-characteristics signals a plurality of gain factors, wherein rates of change in values of said gain factors are limited to be commensurate with temporal post-masking characteristics of a human auditory system, and mapping a respective composite subband signal into one or more interim subband signals according to a respective gain factor, and generating said plurality of output signals by applying one or more inverse filter banks to said interim subband signals.

40. A medium readable by a machine, embodying a program of instructions executable by said machine to perform a method for decoding an encoded signal to generate one or more output signals for presentation via one or more output transducers, said method comprising:

obtaining from said encoded signal one or more composite signals, a plurality of spatial-characteristics signals and an indication of the form of said spatial-characteristics signals, and deriving a plurality of composite subband signals from said one or more composite signals, wherein each spatial-characteristics signal is associated with a respective composite subband signal and represents spatial characteristics of a respective soundfield corresponding to said respective composite subband signal, wherein said indication indicates whether said spatial-characteristics signals are in a first form representing a plurality of signal levels and/or are in a second form representing one or more directions, deriving from said spatial-characteristics signals a plurality of gain factors and mapping a respective composite subband signal into one or more interim subband signals according to a respective gain factor wherein, for said associated spatial-characteristic signal having said first form, said mapping is also according to a spatial configuration signal associated with said signal levels and a transducer configuration signal representing a spatial configuration of said output transducers, and wherein, for said associated spatial-characteristic signal having said second form, said mapping is also according to said one or more directions and said transducer configuration signal, and generating said plurality of output signals by applying one or more inverse filter banks to said interim subband signals.

41. A medium according to claim 40 wherein said method is such that rates of decrease in values of said gain factors are limited to be commensurate with temporal post-masking characteristics of a human auditory system.

42. A medium according to claim 39 or 40 wherein said method is such that said composite subband signals are derived by applying a filter bank or a transform to said one or more composite signals.

43. A medium according to claim 39 or 40 wherein said method is such that said composite signal is a parametric signal and said deriving comprises generating a spectral or a temporal signal in response thereto.

44. A medium according to claim 39 or 40 wherein said method further comprises obtaining from said encoded signal a delay signal and delaying the mapping of said respective composite signal in response to said delay signal.

45. A medium according to claim 39 or 40 wherein said method is such that said interim subband signals have bandwidths that are commensurate with the critical-band bandwidths of a human auditory system.

46. A medium according to claim 39 or 40 wherein said method is such that said output signals are generated by applying an inverse filter bank having aliasing cancellation properties or by applying an inverse transform having aliasing cancellation properties, and wherein said mapping limits differences between levels of said interim subband signals in adjacent frequency subbands such that noise resulting from incomplete aliasing cancellation is rendered substantially inaudible.

47. An encoder for generating an encoded signal by encoding a plurality of input signals each representing a respective channel of audio information, said encoder comprising:

means for generating a plurality of channel subband signals representing said input signals in a plurality of frequency subbands, means for generating a composite signal representing at least a portion of the bandwidth of said input signals, means for generating a spatial-characteristic signal representing spatial characteristics of a soundfield associated with said composite signal in response to respective channel subband signals in a frequency subband, wherein said spatial-characteristic signal is generated in either or both of a first form conveying information representing signal levels of said respective channel subband signals and in a second form representing one or more intended directions, wherein the forms in which to generate said spatial-characteristics signal are determined adaptively, and means for assembling said composite signal, said spatial-characteristics signal and an indication of the form of said spatial-characteristics signal into said encoded signal.

48. An encoder according to claim 47 where, in response to said respective channel subband signals in a respective frequency subband, said spatial-characteristics signal is generated in said first form if said soundfield is deemed to have a number of apparent directions greater than a threshold number.

49. An encoder according to claim 48 wherein said threshold number is one and said soundfield is deemed to have one apparent direction when only one of said respective channel subband signals has significant spectral energy or when all of said respective channel subband signals having significant spectral energy also have correlated amplitudes and correlated phases.

50. An encoder according to claim 47 wherein said respective spatial-characteristics signal is generated in said second form such that it also represents a measure of soundfield dispersion about an intended direction.

51. An encoder according to claim 47 wherein said spatial-characteristics signal is generated in said first form such that rates of decrease in values of said information representing said signal levels are limited to be commensurate with temporal post-masking characteristics of a human auditory system.

52. An encoder for generating an encoded signal by encoding a plurality of input signals each representing a respective channel of audio information, said encoder comprising:

means for generating a plurality of channel subband signals representing said input signals in a plurality of frequency subbands, means for generating a composite signal representing at least a portion of the bandwidth of said input signals, means for generating a spatial-characteristic signal representing spatial characteristics of a soundfield associated with said composite signal in response to respective channel subband signals in a frequency subband, wherein rates of change in said spatial-characteristic signal are limited to be commensurate with temporal post-masking characteristics of a human auditory system, and means for assembling said composite signal and said spatial-characteristics signal into said encoded signal.

53. An encoder according to claim 47 or 52 further comprising means for combining two or more channel subband signals in a respective frequency subband to generate said composite signal.

54. An encoder according to claim 47 or 52 further comprising means for generating a wideband signal by combining two or more of said input signals, and means for generating said composite signal by applying a filter bank or a transform to said wideband signal.

55. An encoder according to claim 47 or 52 further comprising means for applying a filter bank or a transform to two or more of said input signals and means for generating said composite signal by combining subband signals that are obtained by applying said filter bank or said transform.

56. An encoder according to claim 47 or 52 wherein said composite signal is a parametric signal.

57. An encoder according to claim 52 wherein said spatial-characteristic signal represents one or more intended directions and rates of change in the spatial-characteristic signal are limited to control a rate at which said intended directions can change orientation.

58. An encoder according to claim 52 wherein said spatial-characteristic signal conveys information representing signal levels of said respective channel subband signals and said rates of change in the spatial-characteristic signal correspond to rates of decrease in values of said information representing the signal levels.

59. An encoder according to claim 47 or 52 wherein each of said respective channel subband signals is generated in response to a common time interval of said input signals, and wherein said encoder further comprises means for generating a delay signal indicating where in said common time interval an abrupt change in amplitude or direction occurs in said respective soundfield, and means for assembling said delay signal into said encoded signal.

60. An encoder according to claim 47 or 52 wherein said composite signal is a subband signal that corresponds to a respective frequency subband, and wherein said encoder further comprises means for normalizing information conveyed by said composite signal with respect to a measure of signal level for a channel subband signal in that respective frequency subband having the largest measure.

61. An encoder according to claim 47 or 52 further comprising means for generating a differential-encoded representation of said spatial-characteristics signals corresponding to a plurality of adjacent frequency subbands, wherein said differential-encoded representation comprises one or more codes having a dynamic range that is limited according to spectral leakage characteristics between said channel subband signals in adjacent frequency subbands.

62. A decoder for decoding an encoded signal to generate one or more output signals for presentation via one or more output transducers, said decoder comprising:

means for obtaining from said encoded signal one or more composite signals and a plurality of spatial-characteristics signals, and for deriving a plurality of composite subband signals from said one or more composite signals, wherein each spatial-characteristics signal is associated with a respective composite subband signal and represents spatial characteristics of a respective soundfield corresponding to said respective composite subband signal, means for deriving from said spatial-characteristics signals a plurality of gain factors, wherein rates of change in values of said gain factors are limited to be commensurate with temporal post-masking characteristics of a human auditory system, and for mapping a respective composite subband signal into one or more interim subband signals according to a respective gain factor, and means for generating said plurality of output signals by applying one or more inverse filter banks to said interim subband signals.

63. A decoder for decoding an encoded signal to generate one or more output signals for presentation via one or more output transducers, said decoder comprising:

means for obtaining from said encoded signal one or more composite signals, a plurality of spatial-characteristics signals and an indication of the form of said spatial-characteristics signals, and for deriving a plurality of composite subband signals from said one or more composite signals, wherein each spatial-characteristics signal is associated with a respective composite subband signal and represents spatial characteristics of a respective soundfield corresponding to said respective composite subband signal, wherein said indication indicates whether said spatial-characteristics signals are in a first form representing a plurality of signal levels and/or are in a second form representing one or more directions, means for deriving from said spatial-characteristics signals a plurality of gain factors and for mapping a respective composite subband signal into one or more interim subband signals according to a respective gain factor wherein, for said associated spatial-characteristic signal having said first form, said mapping is also according to a spatial configuration signal associated with said signal levels and a transducer configuration signal representing a spatial configuration of said output transducers, and wherein, for said associated spatial-characteristic signal having said second form, said mapping is also according to said one or more directions and said transducer configuration signal, and means for generating said plurality of output signals by applying one or more inverse filter banks to said interim subband signals.

64. A decoder according to claim 63 wherein rates of decrease in values of said gain factors are limited to be commensurate with temporal post-masking characteristics of a human auditory system.

65. A decoder according to claim 62 or 63 further comprising means for applying a filter bank or a transform to said one or more composite signals to derive said composite subband signals.

66. A decoder according to claim 62 or 63 wherein said composite signal is a parametric signal and said means for deriving is also for generating a spectral or a temporal signal in response thereto.

67. A decoder according to claim 62 or 63 further comprising means for obtaining from said encoded signal a delay signal and for delaying the mapping of said respective composite signal in response to said delay signal.

68. A decoder according to claim 62 or 63 wherein said interim subband signals have bandwidths that are commensurate with the critical-band bandwidths of a human auditory system.

69. A decoder according to claim 62 or 63 further comprising means for applying an inverse filter bank having aliasing cancellation properties or an inverse transform having aliasing cancellation properties to generate said output signals, wherein said means for mapping limits differences between levels of said interim subband signals in adjacent frequency subbands such that noise resulting from incomplete aliasing cancellation is rendered substantially inaudible.

* * * * *